3,375,299
LATENT AMIDOPOLYAMINE CURING AGENTS
FOR EPOXY RESINS AND POLYURETHANES
Morton Levine, Birmingham, Michael J. Neme, Detroit, and Steven G. Plovan, Oak Park, Mich., assignors to General Motors Corporation, Detroit, Mich., a corporation of Delaware
No Drawing. Filed Aug. 16, 1965, Ser. No. 480,116
13 Claims. (Cl. 260—830)

ABSTRACT OF THE DISCLOSURE

A particulate latent diamine curing agent, which is nonreactive with urethane prepolymers, epoxy resins and the like at room temperature but operative to affect rapid cures of these materials at elevated temperatures, is prepared by reacting a suitable solid diamine in finely divided particulate form with an ethylenically saturated carboxylic acid chloride wherein the acid chloride is dissolved in a solvent in which the amine is substantially insoluble such that the acid chloride undergoes reaction with only the amine groups exposed in or near the surface of the solid particle and the unexposed active amine groups below the surface are blocked off and thereby prevented from reacting with synthetic resins at room temperature.

---

This invention relates to rapid curing polyurethane and polyepoxide based adhesives and more particularly it relates to a latent or dormant curing agent for such adhesives.

In order for an adhesive to be useful in production applications it must have certain characteristics in addition to those which relate to its strength and its ability to resist humidity, salt, solvents and other corrosive media. To be used in production it must be rapid curing, nontoxic, easy to handle and it must have a relatively long shelf life so that an adequate supply can be kept on hand. In the past few years a number of new polymeric substances have been introduced which have found application as adhesives. These include epoxide resins and polyurethanes. These substances are not self curing but usually require the incorporation of another chemical into the formulated state for the purpose of cross linking and chain extending. This process is known as curing. Heretofore if an effective curing agent, one which would rapidly cure the adhesive mixture at elevated temperatures, was blended in with the adhesive composition prior to use the material would start to gel and eventually become unusable because it could not be worked and applied to the surfaces to be joined.

However, an ideal adhesive composition would be a one part formulation having a long shelf life, perhaps as long as four to six months, but which after application could be heated to effect an extremely rapid cure. An additional benefit of an adhesive having an extended shelf life at room temperature is that equipment in which it is used need not be cleaned immediately thereafter. A solution to this problem which is the subject of this invention, lies in the preparation of a dormant or latent curing system which at room temperature and under normal atmospheric conditions is unreactive with the adhesive composition, but which becomes reactive at elevated temperatures and effects a cure in the short time required by production line demands.

It is an object of this invention to provide a dormant curing agent for synthetic resins.

It is another object of this invention to provide a dormant curing agent for polyurethane and epoxide based resins, whereby said curing agent is substantially unreactive in said resin system at normal room temperatures and atmospheric conditions but which will rapidly effect a cure of the composition upon its being heated.

It is another object of this invention to provide a method of surface treating an amine curing agent so as to render it substantially unreactive in polyurethane and/or epoxide resin systems at normal room temperatures and atmospheric conditions, but which will effect a rapid cure of the composition upon being heated.

It is a more specific object of this invention to provide a particulate difunctional amine for use as a curing agent when incorporated in adhesive compositions, said curing agent having been processed so as to be unreactive at normal room conditions but so as to be capable of effecting a rapid cure of the adhesive composition upon being heated.

These and other objects are accomplished by reacting a difunctional amine in finely divided particulate form with an organic carboxylic acid chloride under suitable conditions such that the amine groups in the surface of said particle are inactivated by the formation of amides which effectively block off the latent amine groups within the bulk of said particle rendering them unreactive at normal room conditions, and incorporating said curing agent with polyurethane prepolymers and/or an epoxide compound to form an adhesive or surface coating composition which has an extended shelf life at normal room conditions and which is rapidly cured upon heating.

It is well known in the prior art that amines may be used to cure many polymeric substances. The active hydrogen furnished by a primary or secondary amine will react with the isocyanate groups which characterize urethane prepolymers. The primary and secondary amines will also react with the epoxy groups. A multifunctional amine then can act as a chain lengthener or as a cross linking bridge between two chains. It is this type of reaction that is involved in the curing process.

In this invention it is desirable to prevent the curing reactions at room temperature. To accomplish this a primary diamine curing agent in solid finely particulate form is reacted on its surface with a mono- or di-carboxylic acid chloride to form amide groups which are very much less reactive than primary and secondary amines as curing agents. The reaction between a diamine and an acid chloride forms an amide with the evolution of hydrogen chloride. For example, in the case where a difunctional acid chloride is used, the reaction between sebacyl chloride and 2,4,5,6-tetrachloro-m-xylene α,α′-diamine may be illustrated by the following equation.

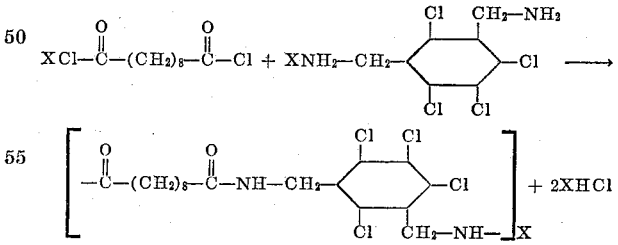

In this manner a polyamide network may be formed about the surface of the particle blocking off the latent amine groups underneath in the body of the particle.

Both aliphatic and aromatic primary diamines are useful in curing adhesive compositions. However, in the application of this invention a solid amine is required. For this reason many of the commercially available aliphatic diamines are excluded because they are liquids. However, any solid amine would be useful.

Examples of solid primary diamines which may be rendered dormant by the process of this invention include 2,4,5,6-tetrachloro-m-xylene-α,α′-diamine, orthotolidine, 1,5-naphthylene diamine, methylene bis-chloroaniline, ortho-, meta-, and para-phenylene diamine, oxydianiline, and anisidine.

Since these solid amines are not particularly soluble in the polyurethan prepolymers and epoxide resins in which they are incorporated, it is desirable that they be in finely divided particulate form if they are to be readily mixed into the adhesive formulation and are to effect an extremely rapid cure. While larger amine particles are operable in this invention their size should preferably be in the range of 10–1000 microns and more ideally in the range of 10–50 microns. For example, when a sample of o-tolidine, unreacted with an acid chloride, with a particle size of 40 microns is added to a given adhesive composition the sample of adhesive is found to set to an unusable state in 3–4 minutes at room temperature. When the particle size of the amine is increased to 60–100 microns no setting of the same adhesive is observed after 12 hours and only slight gelation has taken place after a period of 24 hours. At the elevated temperatures where rapid curing occurs this difference is less pronounced. However, a catalyst with a fine particle size is more readily mixed into the adhesive mixture to obtain a uniform composition and the resulting mixture cures more rapidly and evenly.

The carboxylic acid chloride selected for use in this invention may be a mono- or difunctional acyl chloride. These are compounds in which the hydroxyl group in at least one carboxylic acid radical has been replaced with a chlorine atom. Suitable compounds include aromatic and aliphatic acyl chlorides. Examples of such mono- and difunctional acyl chlorides include acetyl chloride, chloroacetyl chloride, propionyl chloride, n-butyryl chloride, isobutyryl chloride, n-valeryl chloride, isovaleryl chloride, n-caproyl chloride, capryl chloride, stearoyl chloride, benzoyl chloride, o-, m-, and p-toluyl chloride, succinyl chloride, adipyl chloride, sebacyl chloride, and phthaloyl chloride. This listing is intended to be illustrative of the type of acyl chlorides that are suitable for this invention and is not meant to be exclusive. Furthermore, it should be apparent that carboxylic acid halides other than chlorides may be used in the practice of this invention, but they would normally be precluded on the basis of cost.

A solvent for this reaction must be carefully chosen. Such a solvent must dissolve the acid chloride but must not appreciably dissolve the multifunctional amine if the reaction is to be limited to the surface of the amine. The solvent should be chemically inert with respect to the reactants, especially the acid chloride which may be rapidly hydrolyzed. Solvents which have been found particularly useful are the straight chain aliphatic hydrocarbons such as heptane and hexane.

After the acid chloride is dissolved in the solvent the solid amine is added and the mixture stirred gently to effect a suspension. The reaction proceeds readily preferably at room temperature. Higher temperatures are not particularly desirable as the solubility of the amine is increased and proper control of the reaction may not be maintained. The time of the reaction depends upon how dormant it is desired to render the catalyst and the particle size of the catalyst. In the case of the diamines and acid chlorides mentioned above, it has been found that a reaction period of from about 15 minutes to about one hour is preferable. Such a curing agent when incorporated into a polyurethane-epoxy resin adhesive composition will have a room temperature shelf life in excess of 60 days. A further example of the effect of the length of the reaction on the catalyst is given in Example I below. When it is desired to stop the reaction the solids are removed by filtration and washed with a small amount of fresh solvent. The residual solvent is removed by evaporation.

As mentioned above, the effect of this reaction is to inactivate amine groups in the surface molecules by the formation of amides and the evolution of hydrogen chloride. When a monofunctional acid chloride is used the mechanism would appear to be a simple blocking reaction where a molecule containing one acid chloride group reacts with one surface amine group to form an amide. The use of an equally effective difunctional acid chloride complicates the mechanism. In this case it is possible that a polyamide network is formed as suggested by the above equation indicating the reaction between sebacyl chloride and 2,4,5,6-tetrachloro-m-xylene-$\alpha,\alpha'$-diamine. In each case it appears that only those amine groups in or near the surface of the curing agent enter into the reaction. The reactive amine groups below the particle surface are thus "blocked off" or rendered latent.

The treated amine particle is substantially insoluble in the resin compositions that it cures, at least at room temperature. Thus, the amide blocking or shield remains intact and the curing agent is dormant. However, upon heating to elevated temperatures the curing reactions proceed very rapidly. Apparently such temperatures effect a breakdown or elimination of the amide blocking groups. This may be due to decomposition, or melting and dissolution. This is one of the most important advantages of the one part latent curing agent-structural adhesive formulations of this invention. They have a long shelf life at normal room conditions, but are rapidly cured at elevated temperatures.

The curing agents of this invention could be used in combination with any amine curable resin system. However, in the specific applications of the automative industry it has been particularly well applied to polyurethane and epoxy resins. Elastomeric polyurethane prepolymers are rapidly cured by amines but the adhesive bond to metals is relatively weak. Epoxy resins produce strong adhesives but most have a rate of curing that is too slow for many production applications. However, in a mixture of the two, the larger proportion of which is a polyurethane prepolymer, the advantages of each type of compound may be combined. For this reason much of the work with the latent catalyst of this invention has been with adhesive formulations including both polyurethane and epoxy compounds.

The curing agents are useful in a wide range of urethane prepolymers. Urethane prepolymers are formed by the reaction of a multifunctional isocyanate with a polyol in which the polyol is a reactive hydrogen containing compound having at least two hydroxyl groups, such as a hydroxyl terminated polyether or polyester having a molecular weight of at least 500. The preparation of suitable polyester urethane and polyether urethane prepolymers are described in U.S. Patents 2,620,516; 2,625,531; 2,692,873 and 2,692,874. Suitable polyurethanes are prepared by reacting an organic diisocyanate with a dihydroxy polyester such as polyethylene adipate or with a dihydroxy polyether such as polybutylene ether glycol.

Suitable diisocyanates are any aromatic and/or aliphatic diisocyanates such as p,p'-diisocyanato diphenyl methane, 2,4-toluene diisocyanate, naphthylene-1,5-diisocyanate and hexamethylene diisocyanate.

The amine curing agent of this invention is also useful to cure epoxy resins. Although there are a number of possible reactants and a wide variety of possible epoxy resin molecules the ones having the known commercial significance in the United States are: the diglycidyl ether of bisphenol A (and its homologs), glycidyl ethers of glycerol, butanediol and other aliphatic polyhydric alcohols, resorcinol diglycidyl ether and diglycidyl ethers of other aromatic polyhydric alcohols, glycidyl ether of bisphenol F, glycidyl ether of tetrakis (hydroxy phenyl) ehane, and poly-glycidyl ethers of polynuclear polyhydroxy phenols such as the novolac resins.

As mentioned above, in many applications it is desirable to formulate mixtures of epoxy and urethane resins. Where ease of application is an important criterion it may be desirable to have the respective polymeric components in liquid form. Thus, an adhesive composition in which the curing agent of this invention has found particularly advantageous application is in the mixture of a liquid polyurethane prepolymer, formed by the reaction between toluene dissocyanate and polybutylene ether glycol, and a low molecular weight liquid diepoxide or polyepoxide such as resorcinol diglycidyl ether or butanediol glycidyl ether.

The following specific examples of preferred embodiments more clearly illustrate the practice and utilization of our invention.

EXAMPLE I

A novel latent amine curing agent was prepared in the following manner. Sixty grams sebacyl chloride were dissolved in 2500 milliliters of dry heptane. 150 grams of 2,4,5,6-tetrachloro-m-xylene-α,α'-diamine having a particle size of 10–50 microns were added to the solution, but it was not soluble therein. The mixture was slowly stirred and allowed to react at room temperature for one hour. The solids were removed by filtration and washed with fresh heptane. The residual solvent was removed by evaporation.

46.6 grams of this reacted material were then added to 100 grams of a polyurethane prepolymer and 24.2 grams resorcinol diglycidyl ether. The urethane component was a reaction product of 2,4-toluene diisocyanate and 1,4-butylene oxide polyglycol having an isocyanate content of 9.2 to 9.5% and a viscosity at 84° F. of 12,000 to 18,000 cps.

When this adhesive composition, including an amine which has been reacted with sebacyl chloride for one hour, is placed in an oven at 120° F. it is still usable and workable after 96 hours. The room temperature shelf life of this adhesive was in excess of 60 days. On the other hand, when the amine has been reacted with the sebacyl chloride for only five minutes or for 30 minutes and then is incorporated into the above adhesive formulation and placed in an oven at 120° F., the adhesive is found to gel into an unworkable state in 24 hours and 48 hours, respectively.

EXAMPLE II

The adhesive composition of Example I, including the fine particles of 2,4,5,6-tetrachloro-m-xylene-α,α'-diamine which had been reacted with sebacyl chloride for one hour, was applied to steel specimens for the purpose of determining the shear strength of the cured adhesive bond. The specimens were placed together under a 2 p.s.i. bonding load and heated at elevated temperatures to effect a cure. The tests in this and the following examples were conducted according to the ASTM D–1002 Test Method, "Strength Properties of Adhesives—Shear by Tension Loading." The results are tabulated below:

| Temperature of Cure, ° F. | Time at Temperature | Lap Shear Strength, p.s.i. |
|---|---|---|
| 250 | 5 minutes | 3,500–4,300 |
| 350 | 5 minutes | 3,000–4,000 |
| 350 | 20 seconds | 3,000–3,500 |

In addition to effecting cure with the aid of a heated fixture, induction (or magnetic) bonding has also been sucessfully employed. Using a Lapel High Frequency Generator (230 v.–25 amp) cure was effected in 10 seconds using a grid setting of 87.5. The resulting lap shear strength was 3500 p.s.i.

EXAMPLE III

Another novel latent or dormant curing agent was prepared in the following maner. 27.7 grams adipyl chloride were dissolved in 2550 milliliters of dry heptane. 158 grams of naphthylene diamine having a particle size in the range of 10–50 microns were added to the solution, but it was not soluble therein. The mixture was slowly stirred and allowed to react at room temperature for one hour. The solids were removed by filtration and washed with fresh heptane. The residual solvent was removed by evaporation.

24 grams of this reactive material were then added to 100 grams of a polyurethane prepolymer, and 24.2 grams resorcinol diglycidyl ether. The urethane component was a reaction product of 2,4-toluene diisocyanate and polybutylene ether glycol having an isocyanate content of 9.2% to 9.5% and a viscosity at 86° F. of 12,000 to 18,000 cps. This adhesive was then applied to the steel specimens and the specimens were placed together under 2 p.s.i. bonding load and heated at 350° F. for 5 minutes. The resulting lap shear strength was 3000–4000 p.s.i.

EXAMPLE IV

Another novel latent curing agent was prepared in the following manner. 51.5 grams phthaloyl chloride were dissolved in 2550 milliliters of dry heptane. 150 grams of orthotolidine having a particle size in the range of 10–50 microns were added to the solution, but it was not soluble therein. The mixture was slowly stirred and allowed to react at room temperature for one hour. The solids were removed by filtration, washed with fresh heptane, residual solvent was removed by evaporation.

46 grams of this reaction material were then added to 100 grams of a polyurethane prepolymer formed by the reaction between 2,4-toluene diisocyanate and polybutylene ether glycol and characterized by an isocyanate content of from about 9.2% to 9.5% by weight and viscosity at 86° F. of from about 12,000 to 18,000 c.p.s. The resulting adhesive was applied evenly to the surface of two steel specimens which were placed together and heated for one hour at 150° F. the resulting lap shear strength was 165 p.s.i. It is noted that the adhesive strength of the cured polyurethane is much less than when epoxy resin is included in the adhesive composition.

EXAMPLE V

A novel latent curing agent is prepared in the following manner. 31 grams succinyl chloride were dissolved in 1700 milliliters of dry heptane. 150 grams 2,4,5,6-tetrachloro-m-zylene-α,α'-diamine having a particle size in the range of 10–50 microns were added to the solution but it was not soluble therein. The mixture was slowly stirred and allowed to react at room temperature for one hour then solids were removed by filtration and washed with fresh heptane, the residual solvent was removed by evaporation.

While this invention has been described in terms of certain preferred embodiments, it is to be understood that other applications would be apparent to those skilled in the art and are within the scope of the invention as defined by the following claims.

We claim:

1. A method of preparing a latent amine curing agent for use in curing polyurethane prepolymers, epoxide polymers having more than one 1,2-epoxide groups, and mixtures of urethane and said epoxide polymers which comprises reacting a solid diamine in finely divided particulate form with an ethylenically saturated carboxylic acid chloride, wherein said acid chloride is dissolved in a solvent in which said amine is substantially insoluble and which solvent is chemically inert with respect to said acid chloride and said amine, said amine being in the solid state throughout said reaction such that the amine groups exposed in or near the surface of said particle undergo said reaction and are converted to amide groups and the active amine groups below the surface of the particle are blocked off and thereby prevented from reacting to cure said compositions in mixtures therewith at room temperature; removing said latent curing agent from said acid chloride solution; and incorporating said latent curing agent into a formulation comprised substantially of a curable material taken from the group consisting of polyurethane prepolymers and said epoxy resins.

2. A method as in claim 1 wherein said amine is an aromatic diamine.

3. A method as in claim 1 wherein said solid amine is taken from the group consisting of o-tolidine, 1,5-naphthylene diamine, and 2,4,5,6-tetrachloro-m-xylene-α,α'-diamine.

4. A method as in claim 1 wherein said acid chloride is taken from the group consisting of phthaloyl chloride, succinyl chloride, adipyl chloride, sebacyl chloride, and acetyl chloride.

5. A method as in claim 1 wherein the particle size of said amine is from 10 microns to 1000 microns in diameter.

6. A method as in claim 1 wherein said solvent is heptane.

7. A finely divided particulate latent diamine curing agent suitable for curing polyurethane prepolymer compositions, epoxide polymer compositions wherein said epoxide has more than one 1,2-epoxide groups, or mixtures of said polyurethane prepolymer and said epoxide compositions when said curing agent is prepared by reacting a solid diamine in finely divided particulate form with an ethylenically saturated carboxylic acid chloride, wherein said acid chloride is dissolved in a solvent in which said solid amine is substantially insoluble and which solvent is chemically inert with respect to said acid chloride and said amine, said amine being in the solid state throughout said reaction such that the amine groups exposed in or near the surface of said particle undergo said reaction and are converted to amide groups and the active amine groups below the surface of the particle are blocked off and thereby prevented from reacting to cure said urethane compositions and said epoxide compositions in mixtures therewith at room temperature, and separating said latent curing agent from said acid chloride solution.

8. A finely divided particulate latent diamine curing agent in a polyurethane prepolymer composition, an epoxide composition wherein said epoxide has more than one 1,2-epoxide groups or a mixture of a polyurethane prepolymer and a said epoxide when said curing agent is prepared by reacting a solid diamine in finely divided particulate form with an ethylenically saturated carboxylic acid chloride, wherein said acid chloride is dissolved in a solvent in which said amine is substantially insoluble and which solvent is chemically inert with respect to said acid chloride and said amine, said amine being in the solid state throughout said reaction such that the amine groups exposed in or near the surface of said particle undergo said reaction and are converted to amide groups and the active amine groups below the surface of the particle are blocked off and thereby prevented from reacting to cure said urethane compositions and said epoxide compositions in mixtures therewith at room temperature, and separating said latent curing agent from said acid chloride solution.

9. A composition of matter as in claim 8 wherein said amine is an aromatic diamine.

10. A composition of matter as in claim 8 wherein the particle size of said diamine is from 10 microns to 1000 microns in diameter.

11. A composition of matter as in claim 8 wherein the particle size of said diamine is from 10 microns to 50 microns in diameter.

12. A composition of matter as in claim 8 wherein said solid diamine is taken from the group consisting of o-tolidine, 1,5-naphthylenediamine, and 2,4,5,6-tetrachloro-m-xylene-α,α'-diamine.

13. An adhesive composition comprising a polyurethane prepolymer, formed by the reaction between a toluene diisocyanate and a polyalkylene ether glycol, said prepolymer characterized by an isocyanate content from about 4.0% to about 10.0%; an epoxide compound having more than one 1,2-epoxide composition; and a finely divided particulate latent amine curing agent when said curing agent is prepared by the method of claim 1.

No references cited.

MURRAY TILLMAN, *Primary Examiner.*

PAUL LIEBERMAN, *Assistant Examiner.*